Feb. 19, 1946.   C. L. PAULUS   2,395,063
INSERT LOCKING MEANS
Filed Nov. 17, 1944
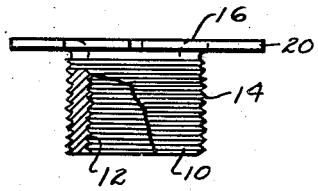
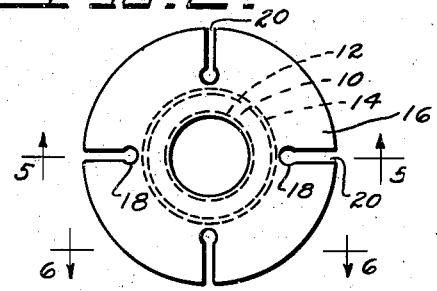
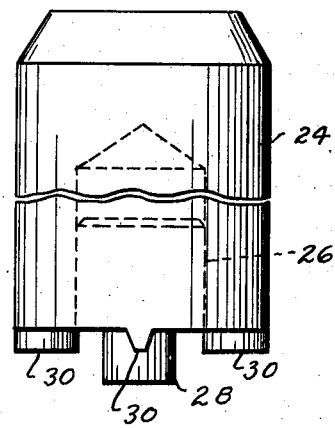
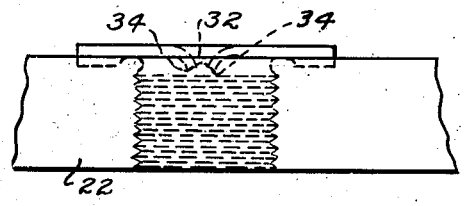
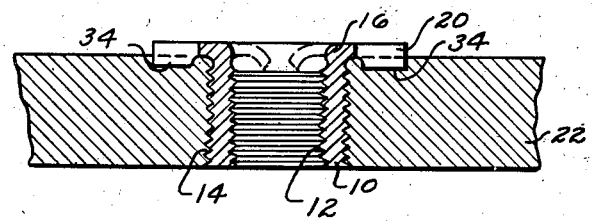
INVENTOR.
CHARLES L. PAULUS
BY
ATTORNEYS Patented Feb. 19, 1946

2,395,063

UNITED STATES PATENT OFFICE 2,395,063

INSERT LOCKING MEANS

Charles L. Paulus, Dayton, Ohio

Application November 17, 1944, Serial No. 563,979

5 Claims. (Cl. 85—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to inserts and a novel means of locking them in place.

In manufactures employing bases of some of the softer low strength materials such as aluminum, zinc alloys, plastics, plywood, etc., to which parts are to be fastened by machine screws or cap screws, it is generally considered poor practice to attempt to use threads which are cut directly in the soft material of the base, and for this reason inserts made of materials of greater strength are located and fixed in the soft material to carry the threads which are to receive the fastening screws. In addition, the inserts are preferably fixed against rotation after they are located in the base material so that when screws are turned to remove them from the inserts the inserts will not turn and come out with the screws.

The conventional method of holding inserts of this kind fixed in the softer material of the base is to provide inserts with normal threads on the inside for the fastening screws, and with oversize threads on the outside for insertion in a normal tapped opening in the base material. There are several conventional means, one of which is usually provided for locking the oversize thread in the base material. One such locking means consists of pinning the insert. Another consists of staking the base material over the end of the insert after it is screwed home.

The faults of conventional practice as above stated are that it is difficult to maintain such close correspondence between the threaded base metal and the threaded insert that the insert may be screwed into place without too much effort and will still be tight enough so as not to work loose in the threads of the base metal upon repeated insertion and removal of the fastening screws.

It is therefore an object of this invention to provide an insert of the general character indicated, having standard external and internal threads, then provide standard tapped holes in the base material, so that the insert may be screwed into the threads of the base material by hand, then, by the same means which locks the insert against rotation, preload the insert in the axial direction in which the load of the fastening screws is to be applied, whereby the relatively free fitting insert is drawn and held by the locking means itself with one side of its external threads in pressure contact with that side of the threads in the base material which must ultimately bear the load of the fastening screws.

Other objects and advantages will be self evident upon consideration of the following description, considered in conjunction with the drawing, wherein:

Fig. 1 is an elevation of an insert as it appears prior to its insertion into the base material, part being broken away to show the internal thread.

Fig. 2 is a top plan view of the insert also prior to its insertion into the base material.

Fig. 3 is an elevation of a staking tool which is employed to stake the flange at circumferentially spaced positions in the same manner as it is staked in Fig. 4.

Fig. 4 is an elevation of an assembly wherein an insert has been screwed into the base material and staked so as to be securely held therein.

Fig. 5 is a view like Fig. 4 except that the assembly is shown in vertical axial section as if taken at 5—5 of Fig. 2.

Fig. 6 is a view showing a fragmentary section through the assembled device taken as at 6—6 of Fig. 2.

The insert as it appears before assembly with the base material (see Figs. 1 and 2), comprises a hub 10 threaded internally at 12 and externally at 14. A flange 16 at one end of the hub is provided with spaced apart holes 18, and with slots 20 which extend from the periphery of the flange inwardly into the holes, whereby both edges of each slot are undercut at the inner end.

The internal threads 12 are cut to standard measurement so that the fastening screws may be entered by hand. The external threads 14 and the corresponding threads in the base material are also cut to standard dimensions whereby the inserts may be screwed into the base material by hand.

When the base 22, into which inserts are to be fastened, has been provided with tapped holes of standard size, the inserts, Figs. 1 and 2, are screwed in until the flange 16 rests on the surface of the base material.

A staking tool, Fig. 3, consists of a body part 24 centrally bored for the pilot 26. The lower end 28 of the pilot fits loosely in the threads 12. Spaced staking lugs 30 extend from the lower end of the body, their spacing being made to correspond to the spacing of the slots 20 in the insert.

The inserts may be screwed in by hand, or, since they enter the body threads freely, the staking tool may be used as a hand-wrench to screw in the inserts. In either event, when the insert is screwed up with the flange 16 lying closely against the base material, and the lugs 30 are registered with the slots 20, the staking tool is struck a sharp blow with a hammer.

The angle on the sides of the staking lugs 30 of the tool is such that, when the tool is struck, the tapering lugs spread the slots 20 as at 32 and simultaneously form lips 34 which they imbed in the soft base material. The spreading of the slots 20, the edges of which constitute the ends of the lips 34, and the anchoring of the ends while they are so spread apart, puts the material of the lips in compression, whereby each pair of lips 34, Fig. 4, constitute a pair of props which are in compression and thus have a vertical component which urges the flange 16 upwardly. This results in the threaded hub 10 being pulled upwardly with respect to the base material at the same time that it is staked in position. This procedure and its result is novel in that when staking is effected in the usual manner the act of staking tends to drive the insert downward as it is staked in position, whereby the insert will loosen when the fastening bolt is tightened and thereby pulls the insert upward.

In the present invention the staking is so effected that the staking operation draws the external threads of the insert against the same working surface of the thread in the base material as do the fastening screws, which has the effect of preloading the insert against the working surface of its external threads so that when the fastening screws are drawn up they merely add load to the preload and for that reason do not loosen the staking, whereas in conventional practice the staking preloads the base material threads on the wrong side so that when the fastening screws are drawn up it loosens the staking.

While in the embodiment of the invention shown and described the inserts are provided with internal threads for receiving fastening screws, it is obvious that the principle of the invention could advantageously be employed with an insert having a plain bore instead of the internal threads 12 for use with a bolt and nut fastener.

Having described an embodiment of the invention and the method of carrying the invention into effect I claim:

1. The method of preloading and fastening an insert of the kind having an externally threaded hub and a radially slotted flange at one end of the hub, in a threaded opening in a base, which consists of screwing the hub into the threaded opening until the flange rests on the surface of the base, spreading the edges of the slots apart and turning said edges downward to thereby imbed them in the base while they are still so spread apart.

2. The method of preloading and fastening an insert of the kind having an externally threaded hub and a flange at one end of the hub which is slotted from near the hub outwardly, in a threaded opening in a base, which consists of screwing the hub into the threaded opening until the flange rests on the surface of the base, placing the flange material adjacent the edges of the slots in compression by spreading the edges of the slots apart, and turning the edges downward to thereby imbed them in the base while they are still under compression.

3. The method of preloading and fastening an insert, of the kind having an externally threaded hub and a flange at one end of the hub having radial slots extending from the periphery to a point near the hub, in a threaded opening in a base, which consists of screwing the hub into the threaded opening until the flange rests on the surface of the base, spreading the sides of the slots apart and coincidentally forcing them downward to imbed them in the base, whereby lips are formed of the edges of the slots which are in compression, and which have an axial component preloading the said threads of said hub.

4. A mechanical structure which comprises a section of relatively soft base material having an opening, internal threads in said opening, an insert which consists of a flange lying on said base material around said opening, a hub on said flange, external threads on said hub lying in said internal threads, and pairs of lips extending at opposite angles with respect to the hub axis from the flange into said base material, the material of said lips being in compression, whereby there is an axial component which preloads the threads in the direction of said flange.

5. An insert adapted to be secured in a threaded opening in a soft base material and fastened therein, said insert comprising an externally threaded hub, a flange of relatively thin deformable material at one end of said hub, said flange being constructed to lie flat on the surface of said soft base material and having a series of slots extending from the periphery to a point near the hub, both edges of the slots being undercut at the end near the hub, whereby both edges of a slot are adapted to be put in compression and deflected downwardly into said soft material thereby to preload the threads of said hub.

CHARLES L. PAULUS.